United States Patent [19]

Blything

[11] Patent Number: 4,951,790

[45] Date of Patent: Aug. 28, 1990

[54] GEROTOR-TYPE CLUTCH WITH ADJUSTABLE VALVE PLATE

[76] Inventor: William C. Blything, 37 Pendragon Rd. Perry Barr, Birmingham. B42 1RN, England

[21] Appl. No.: 241,099

[22] Filed: Sep. 2, 1988

[51] Int. Cl.$^5$ .................. F16D 31/04; F16D 31/08
[52] U.S. Cl. ................... 192/61; 418/61.3
[58] Field of Search ............ 60/487, 489, 473, 476; 418/61.3; 192/61

[56] References Cited

U.S. PATENT DOCUMENTS

| | | | |
|---|---|---|---|
| 2,101,899 | 12/1937 | Eddins | 192/61 X |
| 2,244,929 | 6/1941 | Wall | 192/61 X |
| 4,362,479 | 12/1982 | Pahl | 418/61.3 |
| 4,627,237 | 12/1986 | Hutson | 60/487 |
| 4,748,898 | 6/1988 | Hayashi et al. | 60/487 X |

FOREIGN PATENT DOCUMENTS

| | | | |
|---|---|---|---|
| 586522 | 3/1947 | United Kingdom | 60/489 |
| 690428 | 4/1953 | United Kingdom | 60/487 |

Primary Examiner—Edward K. Look
Assistant Examiner—George Kapsalas
Attorney, Agent, or Firm—Wolf, Greenfield & Sacks

[57] ABSTRACT

A hydraulic transmission device comprises a rotatable casing secured at one end by a first flange to an input shaft and at the other end to a second flange which supports an output shaft. Drive is transmitted by fluid introduced into an area between the outwardly directed contoured teeth extending around the periphery of a rotor, eccentrically mounted on said first flange for rotation therewith, and the inwardly directed contoured teeth extending around the periphery of an annular ring secured to said output shaft, the diameter of the rotor being smaller than the internal diameter of the annular ring thereby allowing the respective teeth of the rotor and the ring to mesh during rotation of the input shaft.

7 Claims, 3 Drawing Sheets

GEROTOR-TYPE CLUTCH WITH ADJUSTABLE VALVE PLATE

The invention relates to a variable speed device that can be used for the transmission of power from an input shaft to an output shaft.

The present invention provides a variable-slip pump/motor having an internally lobed ring meshing with an externally toothed rotor, both rotatably mounted in an inner casing. A plate having a part circular recess and slot is in contact with the one end surface of the lobed ring and rotor and rotates with the rotor. Means are provided to alter the engagement of the slots relative to the rotor and lobed ring while the inner casing revolves. A priming pump is provided to prime the pump/motor and make up fluid losses during running.

Thus the invention comprises a hydraulic power transmission unit consisting of;

a housing having opposed end faces through which extend axially aligned input and output shafts;

a rotatable cylindrical casing positioned in the housing and closed at each end by first and second flanged members rotatable therewith, said output shaft being journalled in a first said member and said input shaft being secured to or integral with the second said member;

an annular member located within said casing and secured to said output shaft and having a plurality of inwardly directed contoured teeth;

a rotor contained within said annular member presenting planar surfaces therewith opposed to said first and second members carried on a driven shaft parallel to said input shaft and secured to said second flange member, the said rotor having a smaller diameter than the inner diameter of said annular member and including a plurality of outwardly directed contoured teeth dimensioned to mesh with the teeth of said annular ring, the rotor having fewer teeth than said ring, whereby rotation of said input shaft causes the rotor to rotate within said annular ring;

a first plate member secured to said driven shaft and in mating relationship with the planar surface opposed to said first flange member and including a crescent shaped element extending parallel to said shaft between the non-meshing teeth of said annular ring and said rotor;

a second plate contained within said casing and having one surface in mating contact with the one planar surface of said annular ring and said rotor and an opposite surface spaced from said second flange member to define a fluid inlet cavity therebetween, said plate being secured to said casing for rotation therewith; means being provided to rotate said second plate between first and second positions within said casing, said plate containing an arcuate recess in said face contacting said other planar face, the recess being positioned to overlie the teeth of said annular ring and said rotor and an arcuate slot diametrically opposed to said recess and positioned to overlie the said teeth to provide communication between the said fluid inlet and the spaces between said meshing teeth, said plate further including a central clearance passageway through which the rotor shaft extends;

and a hydraulic pump means actuated by the said input shaft passageway, means being provided to transfer fluid from said pump into said fluid inlet cavity.

Figure 1:
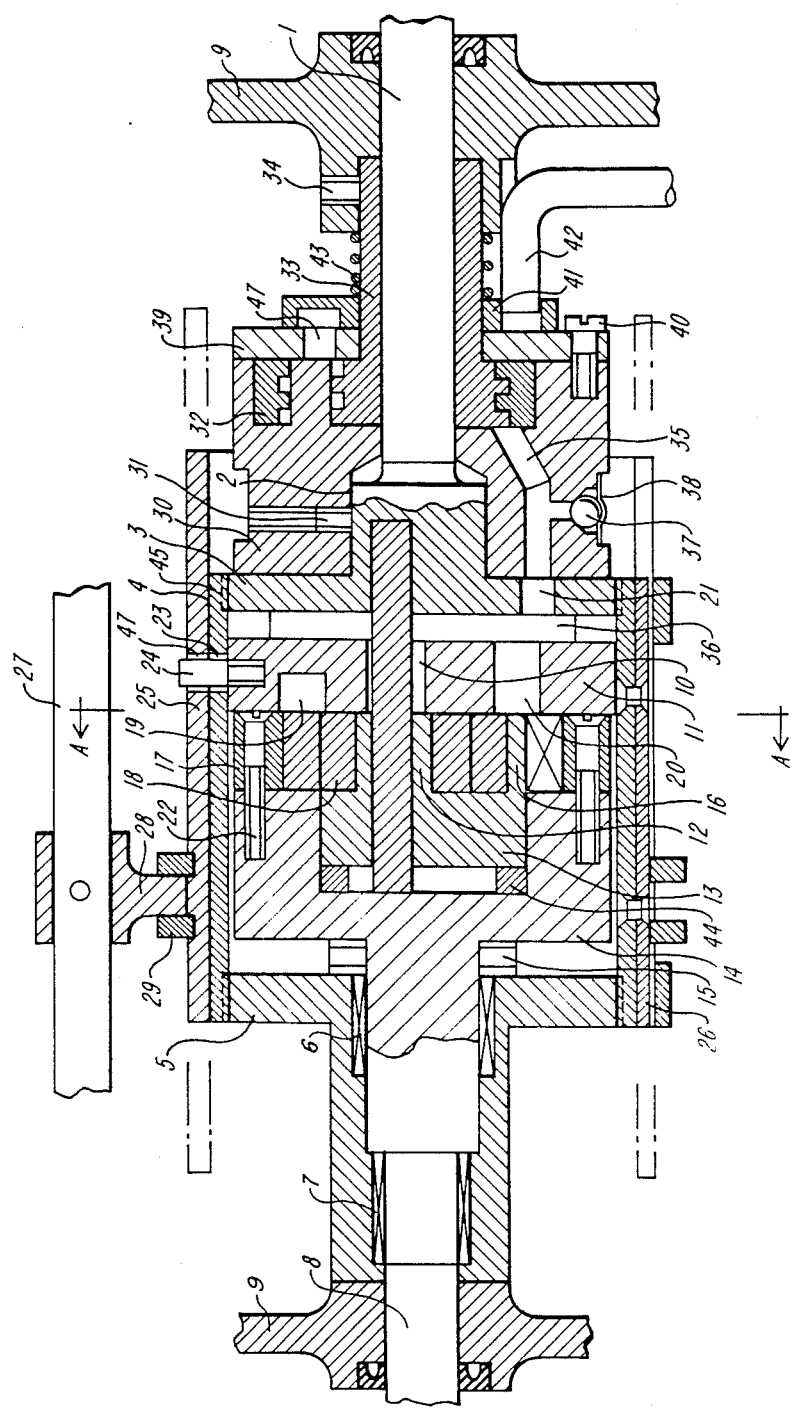
FIG. 1 is a longitudinal section on line B—B in FIG. 2.

An input shaft 1 has an extension that houses a square drive shaft 2 and a flange 3 that is in threaded engagement with an inner cylindrical casing 4 to close one end thereof. Inner casing 4 is in threaded engagement with a flanged housing 5 that closes the other end of casing 4 and extends to house two bearings 6 and 7 that support the output shaft 8. The assembly is housed in an outer casing and fluid reservoir 9. The assembly is not dependent on the outer casing 9 for support.

The square drive shaft 2 extends through a clearance hole 10 in a valve plate 11 into the rotor axial support 12 and crescent block 13 which is rotatably mounted in the output shaft 8 extension 14 and supported against axial movement by a thrust race 44. The output shaft extension 14 is supported against axial movement by a thrust race 15.

Figure 2:
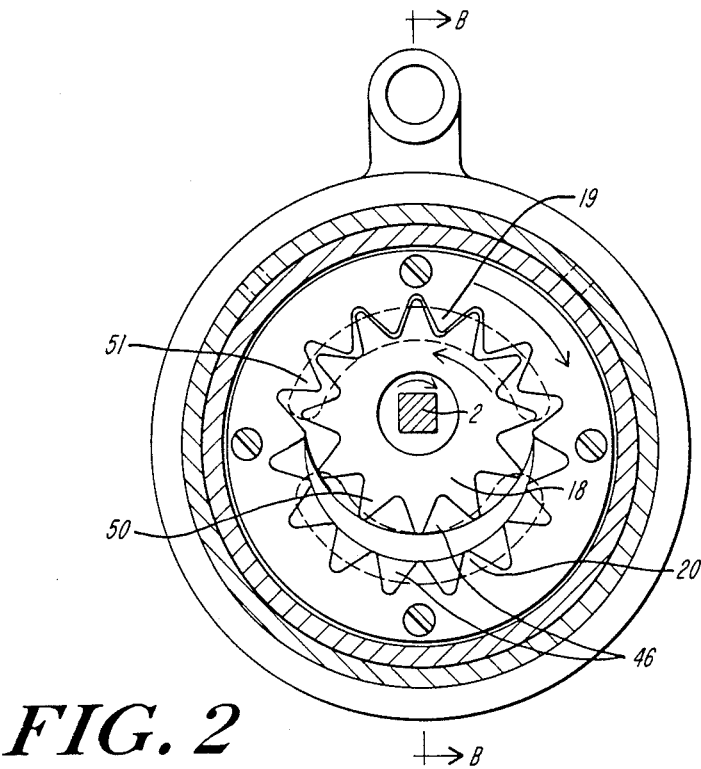
FIG. 2 is a section on line A—A in FIG. 1 showing the position of the plate
Figure 3:
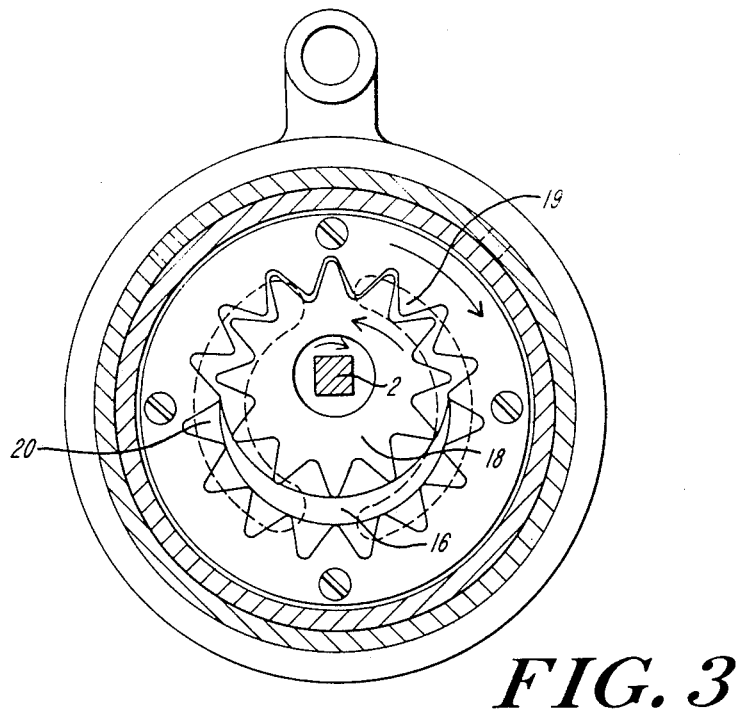
FIG. 3 is a section as FIG. 2 showing the other limit of adjustment of the plate.

A valve plate 11 has one side in contact with a thrust race 45 and the other in running contact with an annular ring 17 having fifteen radially inwardly directed contoured lobed teeth and the eccentrically mounted rotor 18. Rotor 18 has 12 outwardly directed contoured lobed teeth 50 which are partially in mesh with the corresponding teeth 51 of ring 17 (FIGS. 2 and 3). A part circular recess 19 is formed in the valve plate 11 and communicated with the meshed teeth of the lobed ring 17 and rotor 18. A further part circular slot 20 communicates between the fluid input port 21 and the lobed ring 17 and rotor 18 where they are out of mesh. The lobed ring 17 is held in position on the output shaft extension 14 by screws 22.

A circumferential slot 23 is cut in the inner casing and extends for a quarter of the circumference. A screw 24 extends through the slot into the valve plate 11. Screw 24 further extends through an oblique slot in a slide 25 which is arranged to slide on the inner casing 4 between positions shown in chain dotted lines in FIG. 1. A key 26 positions the slide 25 on the inner casing 4. An adjustment rod 27 and a yoke 28 engage with two fixed rings 29 on the slide 25 to provide external adjustment of the position thereof.

A housing 30 is fixed to the input shaft by a screw 31 and contains two elements 32 and 33 of a multi-start screw pump. The inner element 32 is held stationary by a screw 34 extending into the outer casing 9. A passing 35 connects the screw pump with an inlet cavity 36 defined by the opposing faces of valve plate 11 and flange 3 within casing 4; the ball 37 and part circular spring 38 act as a pressure relief valve. A plate 39 is secured to housing 30 by screws 40 and contains a passageway 47 which connects the screw pump to the stationary recessed pump inlet plate 41. Pipe 42 provides a fluid feed for the screw pump and spring 43 urges plate 39 into contact with the inlet plate 41.

Rotation of the input shaft 1 rotates the inner casing 4, slide 25, flanged housing 5, square shaft 2 and rotor axis 12. The output shaft 8 remains stationary when the valve plate 11 is in the position shown in FIG. 2.

The inner element 32 of the screw pump remains stationary whilst the output element 33 moves in and out of mesh with the rotation of the housing. Fluid is thereby drawn up the pipe 42 and is forced through the inlet passage 35, aperture 21 and cavity 36 into part circular slot 20 and thence into the recesses 46 of the rotor 18 and ring 17. Crescent 16 which extends between ring 17 and rotor 18 to separate the respective recesses 46 causes the fluid to be transmitted to the point where the teeth are coming into mesh, further rotation then forces the fluid into the part circular recess 19 and as the teeth come out of mesh the recesses 46 accept the fluid and rotation of the output shaft 8 does not occur. Excess fluid pumped from the screw pump is allowed to escape through the relief valve 37 and 38.

Movement of the adjustment rod 27 causes rings 29 to move slide 25 along the inner casing 4 by causing screw 24 to move in the slot 23 of the inner casing 4 and rotate the valve plate 11 relative to the inner casing 4. As the valve plate 11 moves towards a position where the part circular slots 19 and 20 are in the position shown in FIG. 3. the recesses 46 can no longer accept all of the fluid. In this position, therefore, there is an escape of fluid from between the teeth.

The condition that all the fluid cannot be accepted means that the lobed ring 17 and output shaft 8 are forced to revolve at a low speed. Gradual adjustment of the valve plate 11 allows more fluid to be carried around, this forces increased rotation of the output shaft 8 relative to the input shaft 1. When the position shown as in FIG. 3. has been reached no fluid other than leakage can be accepted thereby causing about a 1:1 rotation of the output shaft 8 with the input shaft 1.

A needle roller bearing may be incorporated between the ring and the inner casing 4 to ease rotation.

The ring 17 rotor 18 teeth ratio allows contact therebetween over an arc approaching 120°. As noted the teeth are not straight flanked but are contoured, the precise contours being calculated to provide efficient operation.

Figure 4:
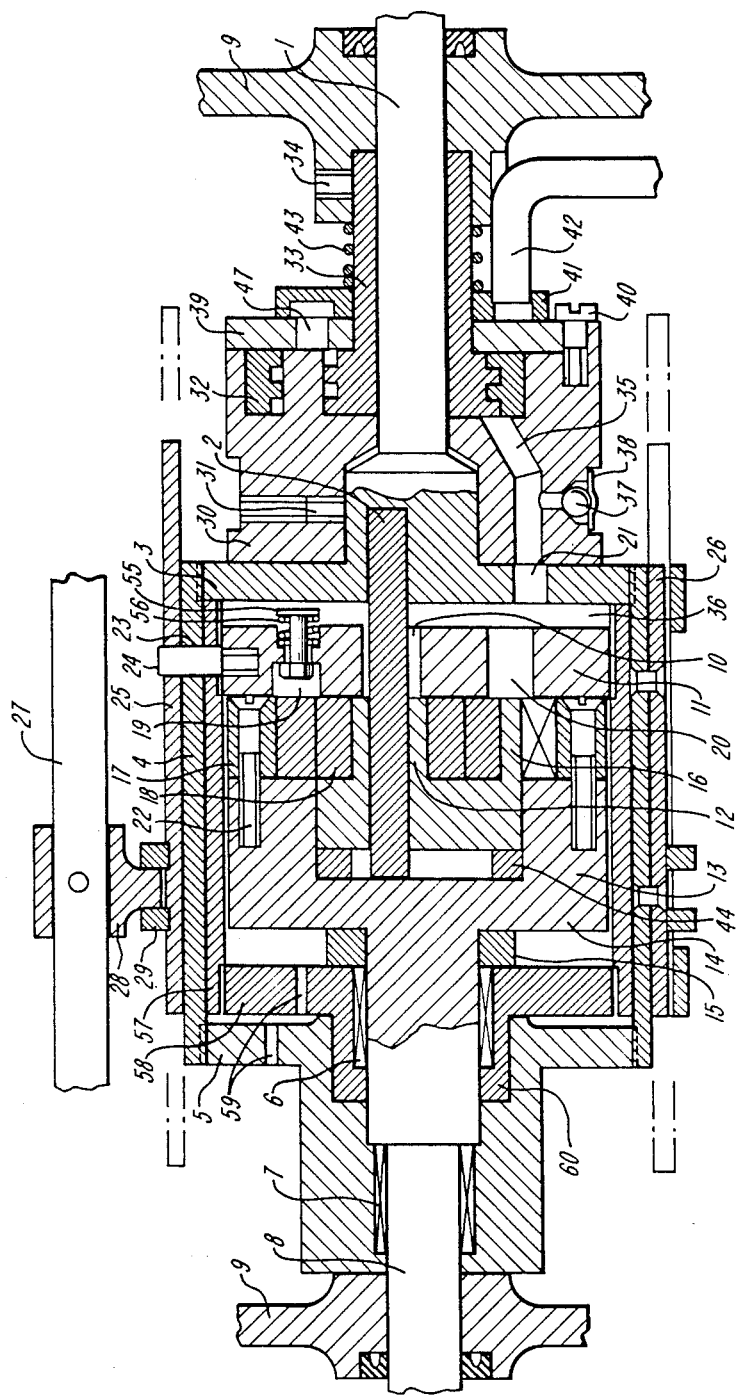
FIG. 4 is a longitudinal section of a second embodiment of the invention.

In FIG. 4 there is illustrated a modified form of the device of FIGS. 1-3 in which like reference numerals refer to like parts. In the modified form a valve plate support sleeve 57 is provided within casing 4 having an end secured to valved plate 11 and the opposite end closed by an end cap 58 located between flange housing 5 and the thrust bearing 15. End cap 58 is secured to flange housing 5 and has a portion 60 extending into said housing, which portion houses bearing 6.

Vents 59 are provided in flange 5 and end cap 58 to relieve internal hydraulic pressure that builds up as a result of leakage passed plate 11 when the device is in use.

An overrun valve 55 urged into a closed position by spring 56 is provided between recess 19 in valve plate 11 and fluid inlet cavity 36.

In the transmission devices described above the pressure ratio does not increase proportionately with the revs ratio, but at only a little over half the ratio, thus at a 16:1 revs ratio the pressure ratio is only 8.2:1.

I claim:

1. A hydraulic power transmission device comprising:
   a housing having opposed end faces through which extend axially aligned input and output shafts;
   a rotatable cylindrical casing positioned in said housing and closed at each end by first and second flanged members rotatable therewith, said output shaft being journalled in said first member and said input shaft being secured to or integral with said second member;
   an annular member located within said casing and secured to said output shaft and having a plurality of inwardly directed contoured teeth;
   a rotor contained within said annular member having flat surfaces opposed to said first and second members, said rotor being carried on a driven shaft parallel to said input shaft and secured to said second flange member, said rotor having a smaller diameter than the inner diameter of said annular member and including a plurality of outwardly directed contoured teeth dimensioned to mesh with the teeth of said annular ring the rotor having fewer teeth than said ring, whereby rotation of said input shaft causes the rotor to rotate within said annular ring;
   a first plate member secured to said driven shaft and in mating relationship with the flat surface opposed to said first flange member and including a crescent shaped element extending parallel to said shaft between the non-meshing teeth of said annular ring and said rotor;
   a second plate contained within said casing and having one surface in mating contact with the one flat surface of said annular ring and said rotor and an opposite surface spaced from said second flange member to define a fluid inlet cavity therebetween, said plate being secured to said casing for rotation therewith; means being provided to rotate said second plate between first and second positions within said casing, said plate containing an arcuate recess in said face contacting said other flat face, the recess being positioned to overlie the teeth of said annular ring and said rotor and an arcuate slot diametrically opposed to said recess and positioned to overlie said teeth to provide communication between said fluid inlet and the spaces between said meshing teeth said plate further including a central clearance passageway through which the rotor shaft extends;
   and a hydraulic pump means actuated by said input shaft, passageway means being provided to transfer fluid from said pump into said fluid inlet cavity.

2. A transmission device according to claim 1 wherein the means to rotate said second plate comprises a circumferential slot in said rotatable casing through which a peg means extends into and is secured to said plate; said preg projecting outwardly of said casing to co-operate with means to move said peg in said slot to rotate the plate between said first and second positions.

3. A transmission device according to claim 2 wherein said second means comprises a slide member extending lengthwise of the said casing and rotatable therewith, said slide member including an oblique slot into which said peg projects, said slide member being movable axially of said casing.

4. A device according to claim 1 wherein there is provided a second plate support sleeve secured at one end to said second plate, closed at the opposite end by a flange member carried by said output shaft, said sleeve being located within said rotatable casing for rotation therewith.

5. A transmission device according to claim 1 wherein the annular ring has 15 teeth and the rotor 12 teeth.

6. A transmission device according to claim 1 wherein the pump means is a multi-start screw pump.

7. A device according to claim 2 wherein a spring loaded valve member is provided between said second plate recess and said fluid inlet cavity.

* * * * *